United States Patent
Sawada

(10) Patent No.: US 9,298,399 B2
(45) Date of Patent: Mar. 29, 2016

(54) PRINT CONTROL APPARATUS AND PRINT CONTROL METHOD WITH PRINTING PLURAL IMAGE PORTIONS GENERATED BY DIVIDING AN IMAGE

(71) Applicant: CANON KABUSHIKI KAISHA, Tokyo (JP)

(72) Inventor: Hideharu Sawada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/600,173

(22) Filed: Jan. 20, 2015

(65) Prior Publication Data

US 2015/0213339 A1  Jul. 30, 2015

(30) Foreign Application Priority Data

Jan. 24, 2014  (JP) .................................. 2014-011402

(51) Int. Cl.
 *G06K 15/02* (2006.01)
 *G06F 3/12* (2006.01)

(52) U.S. Cl.
 CPC ....................................... *G06F 3/12* (2013.01)

(58) Field of Classification Search
 None
 See application file for complete search history.

(56) References Cited

U.S. PATENT DOCUMENTS

| 5,023,728 A * | 6/1991 | Nimura ............... H04N 1/00411 346/104 |
| 6,256,109 B1 * | 7/2001 | Rosenbaum ........... G06K 15/02 358/1.1 |
| 2014/0362402 A1 * | 12/2014 | Tsuboi ............... H04N 1/00411 358/1.15 |

FOREIGN PATENT DOCUMENTS

| JP | 2003191538 A | * | 7/2003 |
| JP | 2005-223833 A |  | 8/2005 |

* cited by examiner

*Primary Examiner* — Thomas D Lee
(74) *Attorney, Agent, or Firm* — Fitzpatrick, Cella, Harper & Scinto

(57) ABSTRACT

There is provided a print control apparatus in which, when poster printing is performed using a printer for printing on continuous paper, a user only needs to specify a finish size (or a scaling factor) so as to perform printing processing with appropriate orientation and a minimum number of segments. To achieve this, based on a length of a short side of a finish size specified by the user and a length in a width direction of continuous paper, the number of segments is calculated to divide an enlarged image obtained by enlarging an original. Then, based on the number of segments, the enlarged image is divided in a short-side direction, and a plurality of image portions generated by the division are laid out in a size of an output sheet, whereby print data is generated.

19 Claims, 12 Drawing Sheets

PRINT CONTROL APPARATUS AND PRINT CONTROL METHOD WITH PRINTING PLURAL IMAGE PORTIONS GENERATED BY DIVIDING AN IMAGE

BACKGROUND OF THE INVENTION

1. Field of the Invention

The present invention relates to a print control apparatus for causing a printing apparatus to print a plurality of image portions obtained by dividing an image to be printed, a print control method, and a storage media.

2. Description of the Related Art

In poster printing, an image is enlarged to a predetermined size and then divided into a plurality of image portions. The image portions are individually printed on a plurality of sheets of a size that can be handled by a printer. Then, a user joins the output sheets together, whereby a product having a large size is completed. Japanese Patent Laid-Open No. 2005-223833 discloses the configuration in which a user enters a finish size (or a scaling factor) and a size of an output sheet that is actually used for printing by a printing apparatus, and based on the information, sets optimum margins when the sheets are bonded together.

Unfortunately, in the technique disclosed in Japanese Patent Laid-Open No. 2005-223833, the user needs to review and set the size of an output sheet to be used with respect to a desired finish size. If the size of an output sheet is not appropriately set, the number of output sheets occasionally increases more than necessary, making the work of pasting complicated. In particular, in a printer which handles continuous paper such as roll paper, whether to print an enlarged original in portrait orientation or to print an enlarged original in landscape orientation depends on an aspect ratio of an original and a finish size. In the conventional technique, however, the user has to bear a load of such determination.

SUMMARY OF THE INVENTION

The present invention was made to solve the above-described problems. Accordingly, an object of the present invention is to provide a print control apparatus capable of causing a printing apparatus to print a plurality of image portions obtained by dividing an image to be printed, and at the same time, to easily perform printing for reducing the number of segments.

In a first aspect of the present invention, there is provided a print control apparatus for causing a printing apparatus to print on a print sheet each of a plurality of image portions obtained by dividing an image to be printed, the print control apparatus comprising: a generation unit configured to generate an enlarged image by enlarging the image to be printed based on a finish size corresponding to a size resulting from bonding together a plurality of print sheets having the plurality of image portions printed thereon; and a print control unit configured to cause the printing apparatus to print each of the plurality of image portions on the print sheet such that the enlarged image generated by the generation unit is divided in a short-side direction of the enlarged image based on a number of segments obtained based on a length of a short side of the finish size and a length of a short side of the print sheet and such that a short side of each of the plurality of image portions obtained by the division coincides with a short side of the print sheet.

In a second aspect of the present invention, there is provided a print control method for causing a printing apparatus to print on a print sheet each of a plurality of image portions obtained by dividing an image to be printed, the print control method comprising: a generation step of generating an enlarged image by enlarging the image to be printed based on a finish size corresponding to a size resulting from bonding together a plurality of print sheets having the plurality of image portions printed thereon; and a print control step of causing the printing apparatus to print each of the plurality of image portions on the print sheet such that the enlarged image generated in the generation step is divided in a short-side direction of the enlarged image based on a number of segments obtained based on a length of a short side of the finish size and a length of a short side of the print sheet and such that a short side of each of the plurality of image portions obtained by the division coincides with a short side of the print sheet.

In a third aspect of the present invention, there is provided a non-transitory computer readable storage medium storing a program for causing a computer to perform the print control method m.

Further features of the present invention will become apparent from the following description of exemplary embodiments (with reference to the attached drawings).

DESCRIPTION OF THE EMBODIMENTS

An embodiment of the present invention will now be described with reference to the attached drawings.

Figure 1:
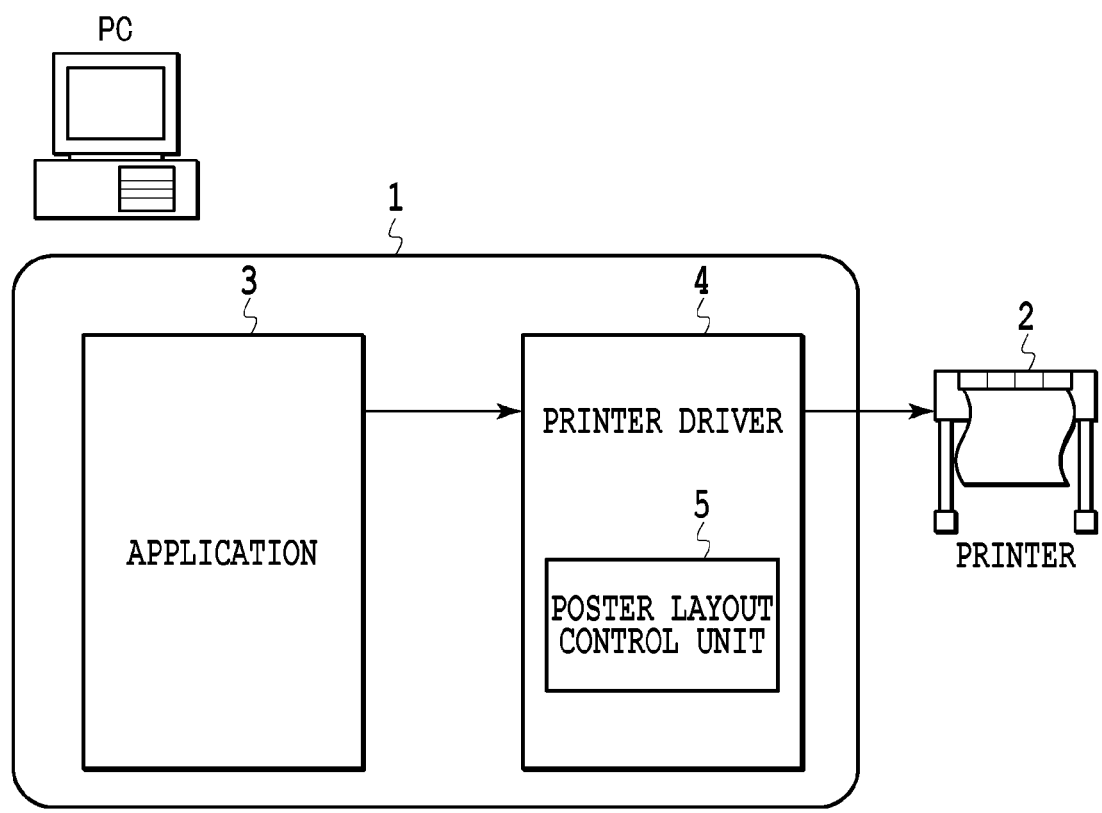
FIG. 1 is a block diagram showing a printing system that can be used in the present invention.

FIG. 1 is a block diagram showing a printing system that can be used in the present invention. In the present embodiment, the printing system includes a host device 1 such as a personal computer and a printer 2. The host device 1 and the printer 2 are connected with each other via a predetermined bi-directional interface such as a USB, an IEEE 1394, or a TCP/IP.

The host device 1 is provided with software such as an application 3 for a user to create an original image and a printer driver 4 for processing image data on the original image created in the application 3 to printable print data for the printer 2. A poster layout control unit performs characterized processing of the present invention when poster printing is specified, and serves as one of the functions of the printer driver 4.

Figure 2:
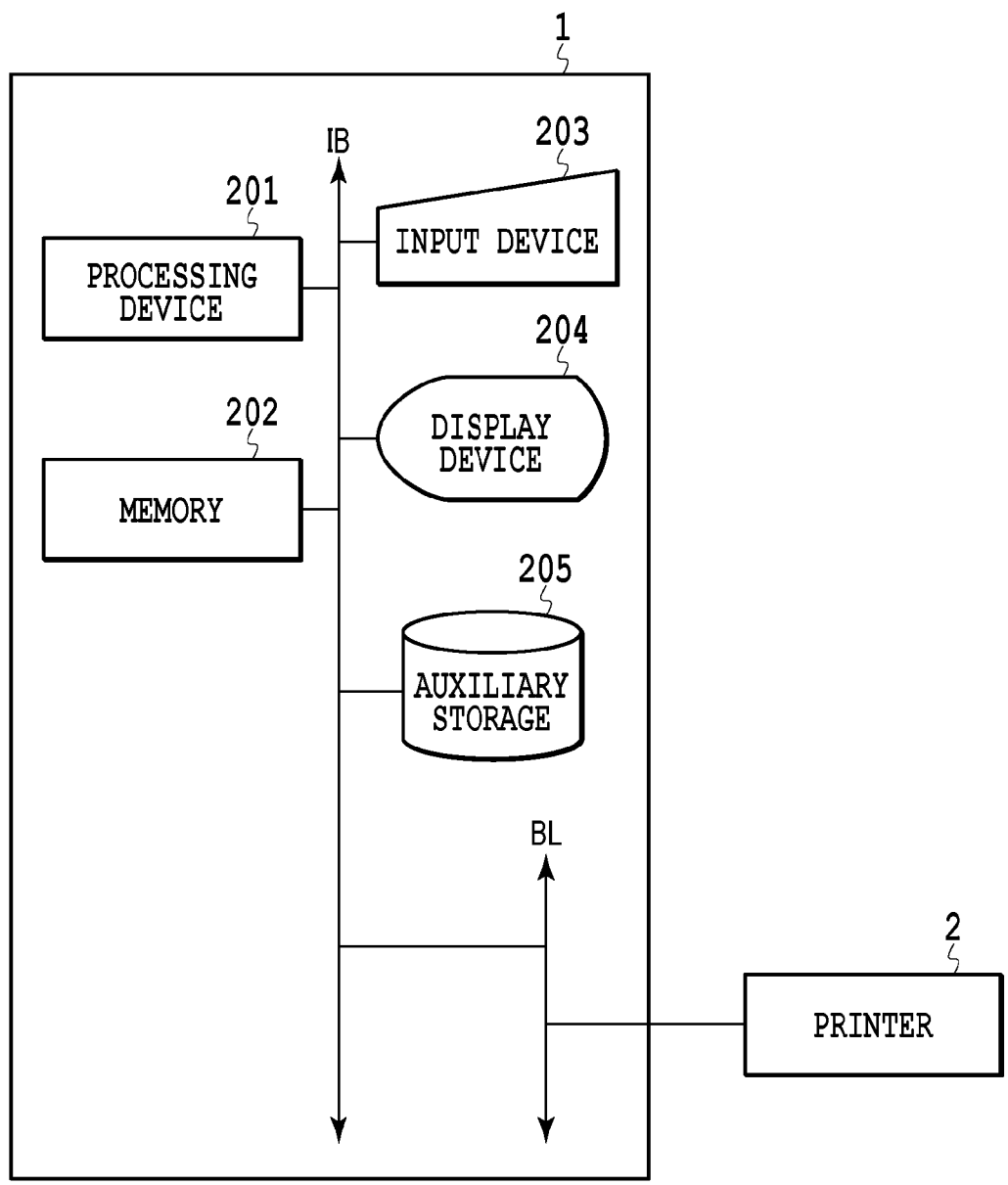
FIG. 2 is a block diagram showing a hardware configuration of the printing system.

FIG. 2 is a block diagram showing a hardware configuration of the printing system. The host device 1 includes a processing device 201 having a CPU, a memory 202 such as a RAM, an input device 203 such as a mouse or a key board, a display device 204 such as a CRT or an LCD, and an auxiliary storage 205 such as a hard disk or a magneto-optical disk. These devices are connected via an internal bus line IB. Incidentally, the input device 203 and the display device 204 may be external devices connected to the host device 1. The processing device 201 controls the processing of the entire system using the memory 202 as a working area according to various programs stored in the auxiliary storage 205. The auxiliary storage 205, for example, stores therein the application 3, the printer driver 4, an OS, and other program information, and is appropriately invoked by the processing device 201 and loaded on the memory 202. The processing device 201 provides various kinds of information for a user via the display device 204 and receives various commands and settings entered by the user through the input device 203. The internal bus line IB is connected to the printer 2 via an external bus line BL, so that the host device 1 can register a job for the printer 2. The processes illustrated in the flow charts of FIGS. 5 and 7 to 9 are executed also by the processing device 201.

Figure 3:
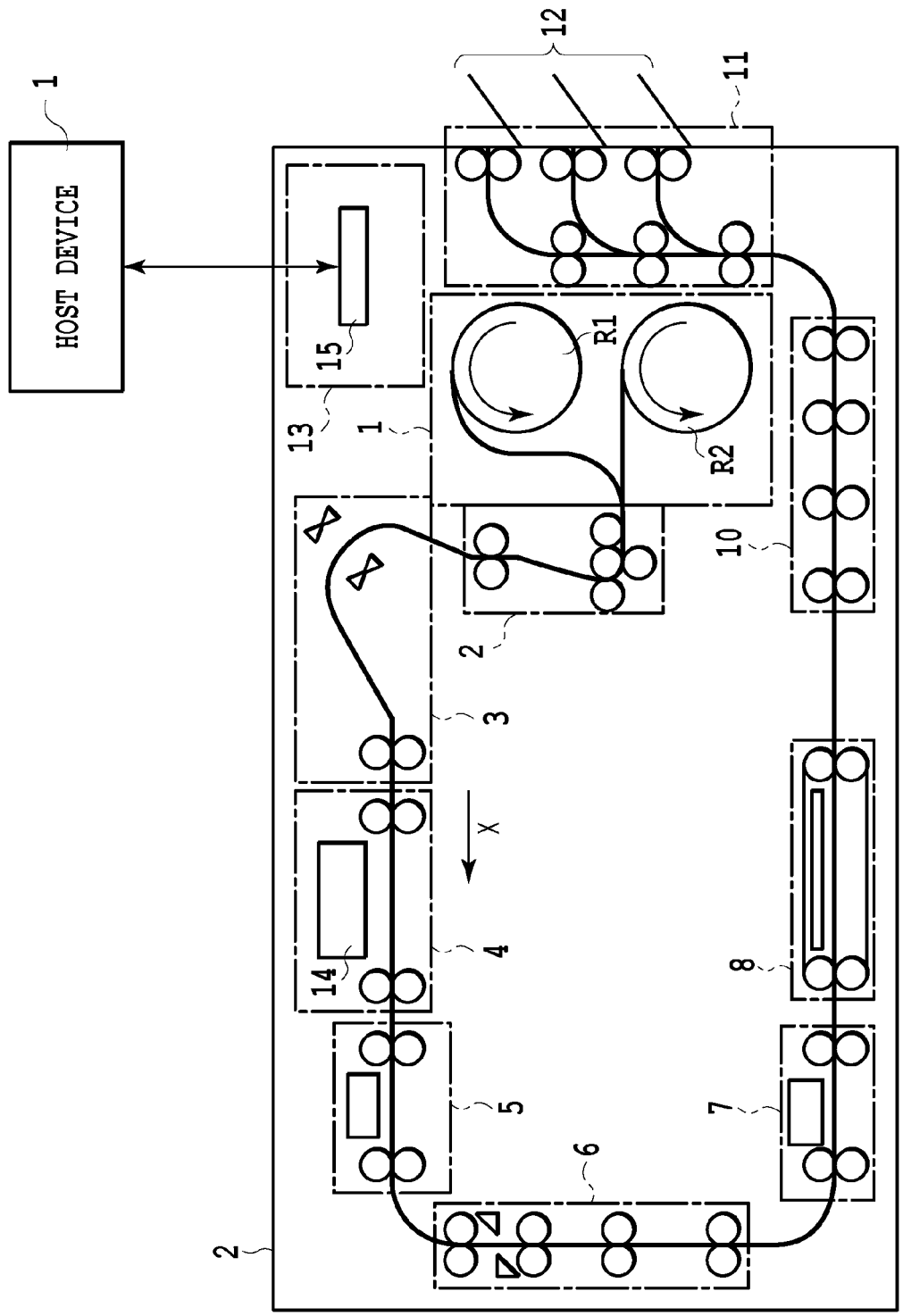
FIG. 3 is a cross-sectional view illustrating an internal configuration of a printer that can be used in the present invention.

FIG. 3 is a cross-sectional view illustrating an internal configuration of the printer 2 that can be used in the present invention. In FIG. 3, a control unit 13 includes, for example, a controller 15 having control over the printer 2. A sheet supply unit 1 accommodates two rolls of paper R1 and R2, alternatively draws a sheet (paper), and supplies the sheet to a conveying path. In the present embodiment, the rolls R1 and R2 have a width of 24 inches (about 610 mm) in a direction crossing a conveying direction of the sheet.

A decurling unit 2 is a unit that reduces a curl (warpage) of the sheet supplied from the sheet supply unit 1. In the decurling unit 2, two pinch rollers are pressed against one drive roller so as to apply warpage to the sheet in a direction opposite to the curl. Passing the sheet through the decurling unit 2 reduces the curling of the sheet in the sheet supply unit 1, and accordingly the sheet is smoothly conveyed.

A skew correction unit 3 is a unit that corrects a skew (inclination with respect to an advancing direction) of the sheet which has passed through the decurling unit 2. A sheet end portion on a side serving as a reference is pressed against a guide member, whereby the sheet is directed so as to proceed straight ahead.

A printing unit 4 prints an image on the conveyed sheet with ink ejected from a print head portion 14. In the print head portion 14 of the present embodiment, a plurality of print heads provided for ink colors are arranged in parallel in an X direction. In the present example, the print head portion 14 has four print heads corresponding to four colors of C (Cyan), M (Magenta), Y (Yellow), and K (Black). The number of colors and the number of print heads are not limited to four. Furthermore, a print head other than an ink jet print head may be used.

An inspection unit 5 is a unit that includes a charge-coupled device (CCD) image sensor or a complementary metal-oxide semiconductor (CMOS) image sensor and optically reads an inspection pattern or an image on the sheet printed by the printing unit 4. The captured information is transferred to the control unit 13 and used to determine the condition of nozzles of the print head portion 14, the sheet conveyance state, the image position, and the like.

A cutter unit 6 is a unit that cuts for each page the image of the printed portion along cut marks printed on the sheet. An information recording unit 7 records, on a margin area of the image sheet, information such as a serial number and a date related to the printed image using letters or codes. A drying unit 8 is a unit that dries applied ink in a short period of time.

A discharge/conveying unit 10 conveys sheets cut by the cutter unit 6 and dried by the drying unit 8 to a sorting unit 11. The sorting unit 11 sorts the printed cut sheets into groups by sizes or the like and discharges them into individual discharge ports. Each discharge port has a tray 12 for receiving the cut sheets. The cut sheets are placed on one of the trays 12.

The processing of poster printing by using the above-described printing system will be described in detail. To perform poster printing on an original image created in the application 3, the user selects a print dialog from a menu on the application 3 and activates it. If a property button or the like is pressed in the print dialog on the application 3, a UI screen of the currently set printer driver 4 is opened. The user can check or change the print settings on this screen.

Figure 4:
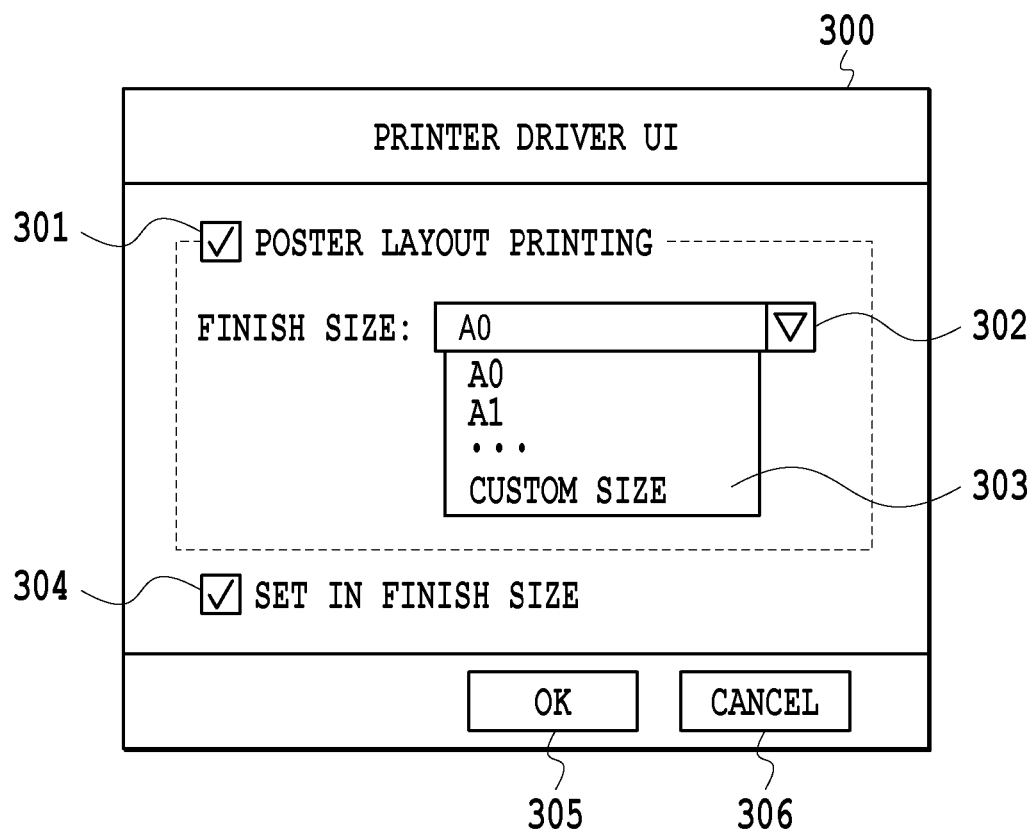
FIG. 4 shows an exemplary UI window provided by a printer driver.

FIG. 4 shows an exemplary UI window provided by the printer driver 4. In FIG. 4, a poster layout printing check box 301 is a check box marked by a user when poster printing is needed. If the poster layout printing check box 301 is marked, a finish size combo box 302 is activated, and a finish size can be selected from a plurality of sizes including a standard size. The finish size is a size of a product obtained by printing by the printer 3 and bonding by a user. For example, in a case where image portions are printed by the printer 3 according to the process which will be described later, the finish size is defined by the size of a product obtained after the user bonds together a plurality of printed materials each having one of the plurality of image portions printed thereon.

Figure 5:
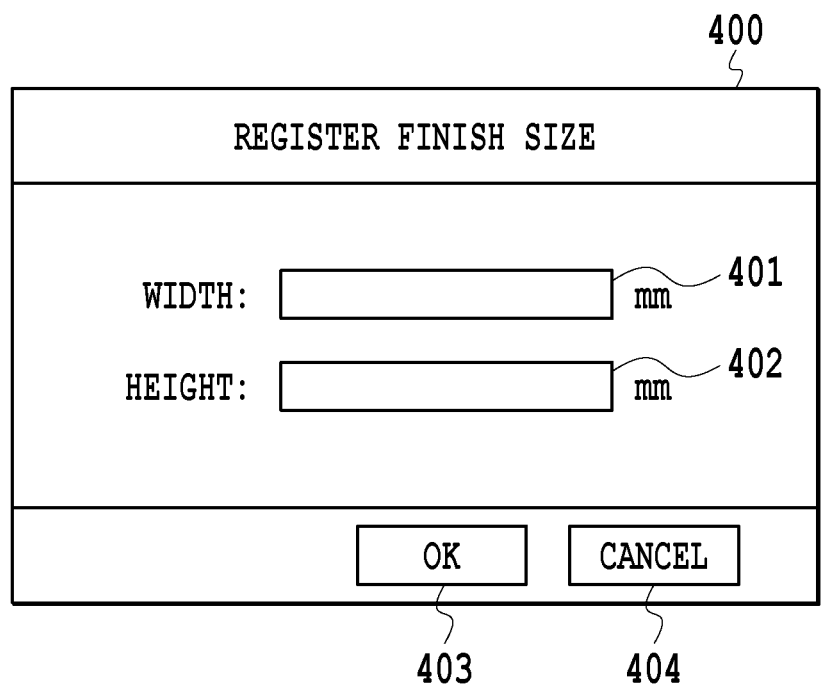
FIG. 5 shows an exemplary UI window provided by the printer driver.

If a custom size 303 is set in a finish size combo box 302, a new window as shown in FIG. 5 is displayed, in which the user enters a height and a width of a desired finish size to an edit box. In FIG. 5, the height and the width are entered in millimeters. However, they may be entered in inches or the like. If an OK button is clicked after the height and the width are entered, the size entered in the window of FIG. 5 is set as a finish size of poster printing, and then the window is closed. Meanwhile, if a cancel button is clicked, the height and the width set in FIG. 5 are cancelled.

Meanwhile, the other check box 304 shown in FIG. 4 is a combo box for setting whether the entire original image sets in the set finish size. The aspect ratio of the original image created by the user and the aspect ratio of the finish size set in the finish size combo box are not always the same. If these aspect ratios are different, there may be a case where a printed sheet includes a blank even if the entire image to be printed is printed on the print sheet or a case where the image to be printed is partly lost even if the printed sheet does not include a blank. More specifically, in a case where a vertical scaling factor is larger than a horizontal scaling factor, enlarging an image based on the vertical scaling factor causes an enlarged image to have a width that is greater than the width of the finish size, resulting in a product having the image lost in left and right ends. Meanwhile, enlarging an image based on the horizontal scaling factor causes an enlarged image to have a height that is less than the height of the finish size, resulting in a product having unnecessary margin areas in top and bottom ends. In the present embodiment, the check box 304 is used by the user to select from printing an image by the scaling factor according to the former case and printing an image by the scaling factor according to the latter case. If the check box 304 is marked, a product can be obtained in which the original image is inscribed in relation to the finish size, that is, a product can be obtained in which the entire original image is printed but large margins may be included. Meanwhile, if the check box 304 is not marked, a product can be obtained in which the original image is circumscribed in relation to the finish size, that is, in which unnecessary margins are not included but not the entire original image may be printed.

In FIG. 4, if an OK button is clicked after the above-described items are set in the boxes, the printer driver 4 starts the process of poster printing according to the set items and the original image. Meanwhile, if a cancel button is clicked, all of the items set in FIG. 4 are canceled.

Figure 6:
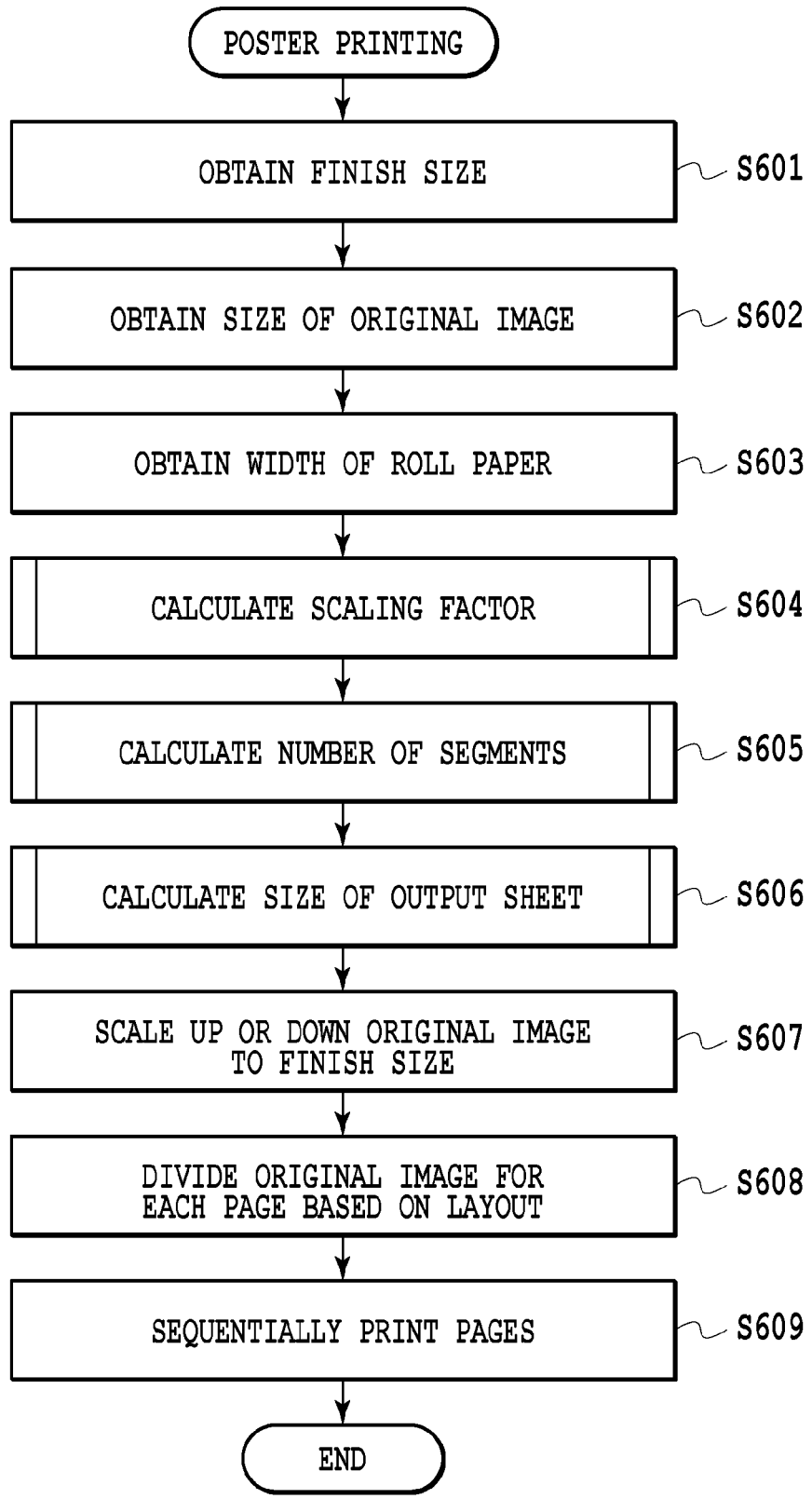
FIG. 6 is a flow chart illustrating the steps of poster printing processing.
Figure 7:
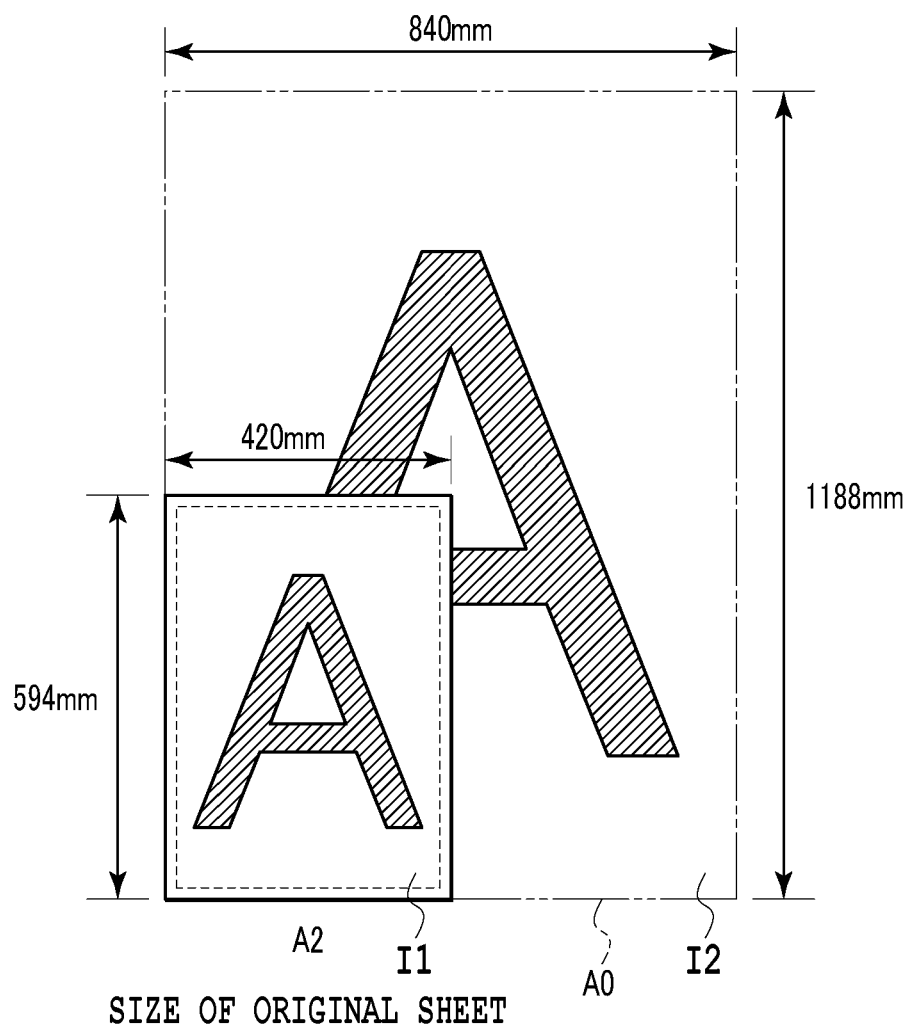
FIG. 7 is a schematic view showing an A2 size original on which poster printing is performed to a finish size A0.

FIG. 6 is a flow chart illustrating the steps of poster printing processing executed by the printer driver 4 according to the items set in the above window and the original image. Here, a description will be given of the case of using the printer 2 having loaded thereon 24-inch (about 61 cm) roll paper to perform poster printing on an A2 size original image to an A0 finish size as shown in FIG. 7. Incidentally, settings to the printer driver are made with the content shown in FIG. 4.

Once the present processing starts, first, the printer driver 4 obtains a finish size in step S601. In the present example, the A0 size (width 840 mm×height 1188 mm) is obtained. In the following step S602, the size of the original image is obtained. In the present example, the A2 size (width 420 mm×height 594 mm) is obtained. In the following step S603, a width W of the roll paper loaded on the printer is obtained. Here, W=610 mm is obtained. In step S604, a scaling factor D is calculated based on the finish size obtained in step S601 and the size of the original image obtained in step S602.

Figure 8:
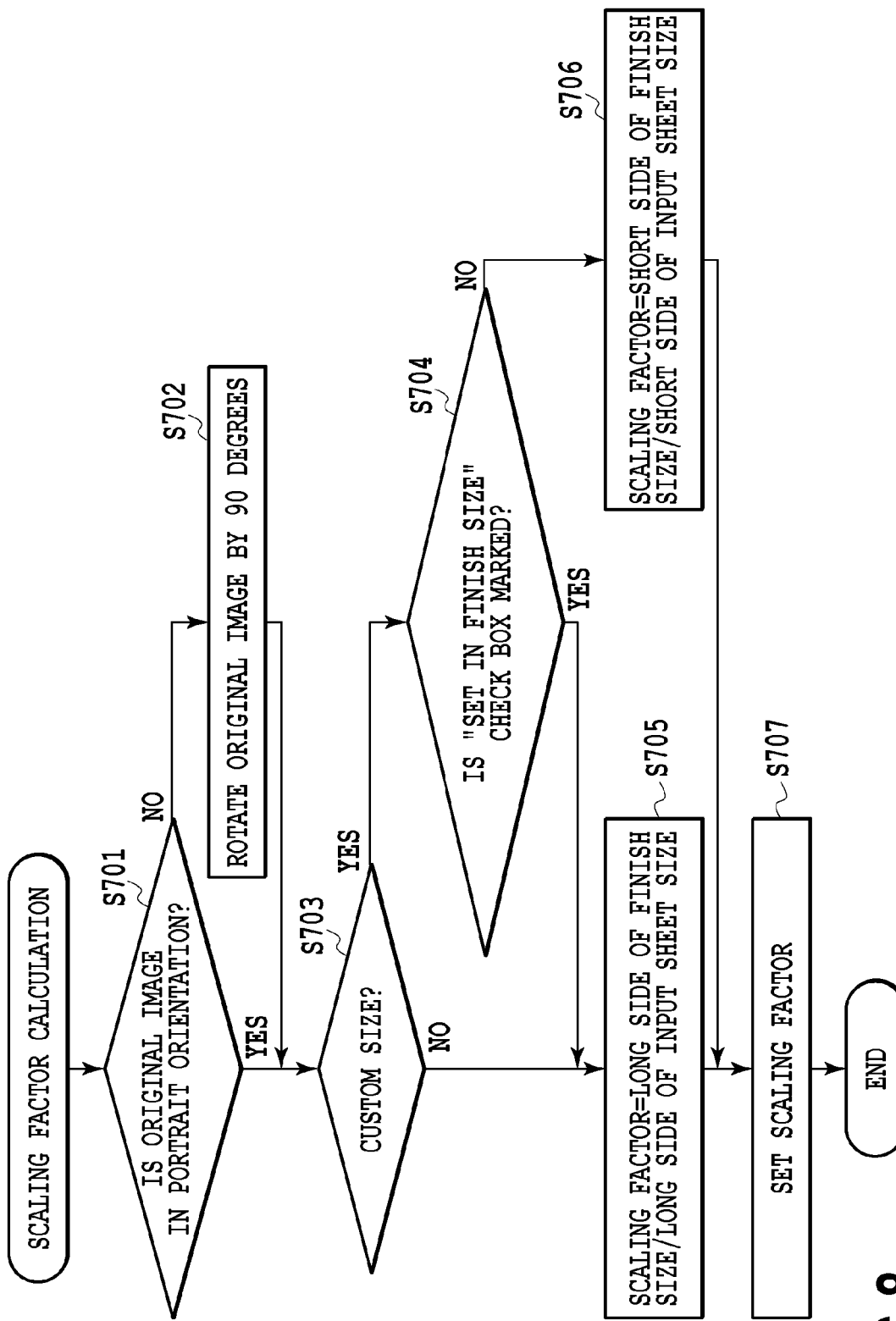
FIG. 8 is a flow chart illustrating the process of calculating a scaling factor.

FIG. 8 is a flow chart illustrating the process of calculating the scaling factor D. Once the present processing starts, the printer driver 4, in step S701, determines whether the original image is a portrait-oriented image or a landscape-oriented image based on the aspect ratio of the original image obtained in step S602. If the original image is a landscape-oriented image, image data on the original image is rotated by 90 degrees in step S702, and then the process proceeds to step S703. Meanwhile, if the original image is a portrait-oriented image, the current orientation is kept and the process proceeds to step S703. In this manner, in the present embodiment, an original is set in portrait orientation to perform a printing operation. Since the original image of the present example is a portrait-oriented image, the current orientation is kept and the process proceeds to step S703.

In the case of using the printer having the roll paper loaded thereon as in the present embodiment, a printable image area in a width direction is limited, but a printable image area in a height direction (a conveying direction of a sheet) is not limited as long as the roll paper remains. Accordingly, to simplify the pasting procedure after the printing as possible, it is preferable to set the long side of the original image to coincide with the height direction. Therefore, in step S702, rotation processing is performed on the original image.

In step S703, it is determined whether a custom size is set to a finish size in the window shown in FIG. 4. If set, the process proceeds to step S704, and it is determined whether the check box 304 is marked in the window shown in FIG. 3. If not marked, the process proceeds to step S706, and the scaling factor D of the original image is calculated based on a ratio between the short side of the original image and the short side of the finish size. Meanwhile, if it is determined that a custom size is not set in step S703, or if it is determined that the check box 304 is marked in step S704, the process proceeds to step S705. In step S705, the scaling factor D is calculated based on a ratio between the long side of the original image and the long side of the finish size.

In the present example, since it is determined that a custom size is not set in step S703, the scaling factor D is calculated in step S705. Referring to FIG. 7, the long side of the finish size is 1188 mm and the long side of the original image is 594 mm. Therefore, the scaling factor D is D=1188/594=2.

After that, the process proceeds to step S707, and the scaling factor D calculated in step S705 or step S706 is set. Then, the present processing is completed.

Refer back to FIG. 6. After the scaling factor D of the original image is set in step S604, the process of the printer driver 4 proceeds to S605, and a number of segments N of the enlarged image is obtained.

Figure 9:
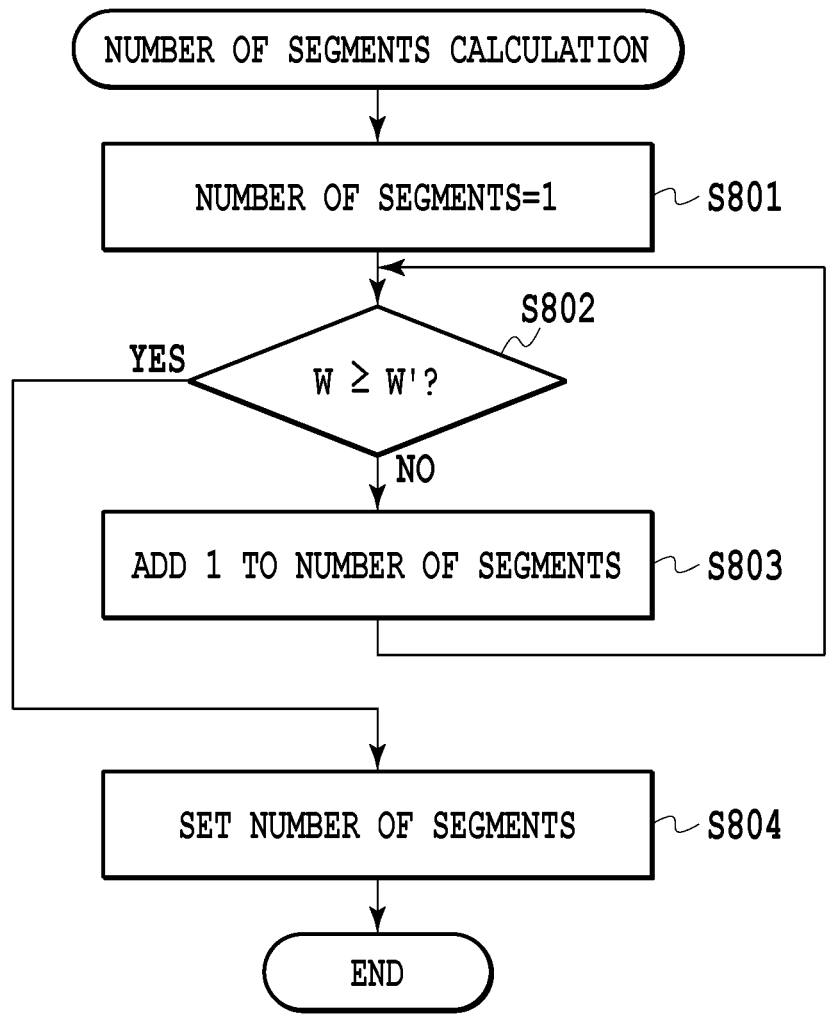
FIG. 9 is a flow chart illustrating the process of obtaining the number of segments.

FIG. 9 is a flow chart illustrating the process of obtaining the number of segments N. Once the present processing starts, the printer driver 4, first in step S801, sets the number of segments N to an initial value of 1.

In the following step S802, the short side of the finish size is divided by the number of segments N, and it is determined whether a value W' obtained by the division is equal to or less than the width W of the loaded roll paper. If W<W', it is determined that further division is needed. After the number of segments N is incremented in step S803, the process goes back to step S802. This operation is repeated until the determination reaches W≥W' in step S802. In the present example, with respect to the width W of the roll paper=610 mm, if N=1, W'=840>W, and if N=2, W'=420<W. Accordingly, the process proceeds to step S804 with the number of segments N=2.

In step S804, the current number of segments N is set as the actual number of segments. In the present example, the number of segments N=2 is set. The present processing is completed.

As described above, not the long side but the short side of the finish size is set to coincide with the width direction of the roll paper to determine the number of segments N in the short-side direction. This can reduce the number of segments, that is, the number of pieces pasted together to obtain a product, as possible.

Refer back to FIG. 6 again. After the number of segments N is set in step S605, the process of the printer driver 4 proceeds to step S606, and a size of an output sheet which is a size of a print sheet is set.

Figure 10:
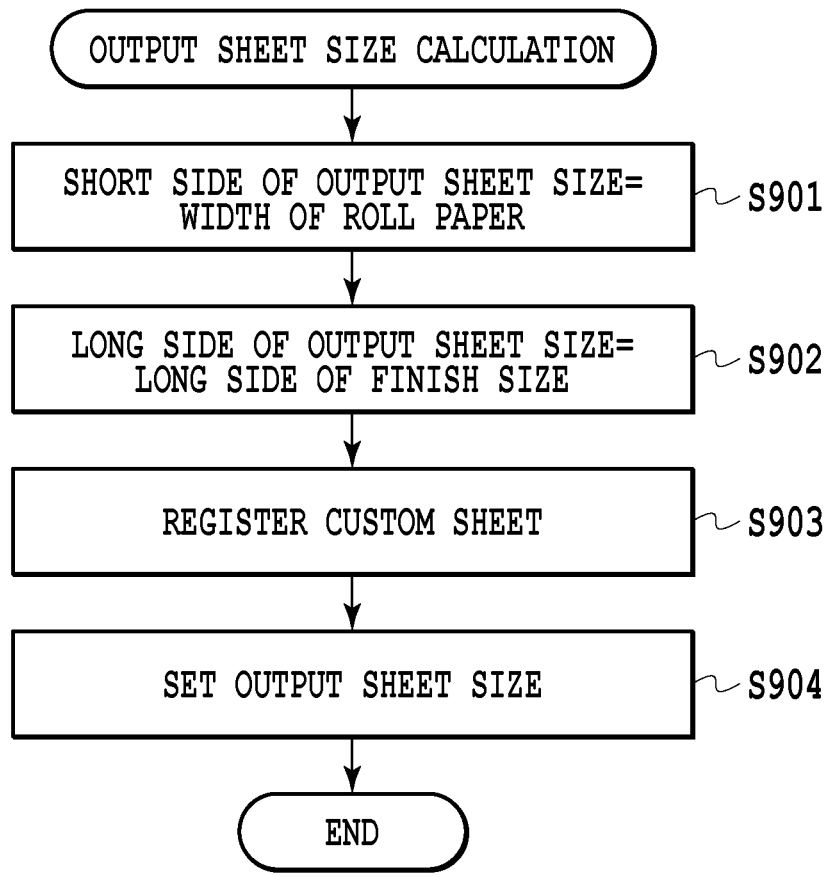
FIG. 10 is a flow chart illustrating the process of obtaining the size of an output sheet.

FIG. 10 is a flow chart illustrating the process performed by the printer driver 4 to obtain the size of the output sheet. Once the present processing starts, the printer driver 4, first in step S901, sets the width of the output sheet to the width W of the roll paper. In step S902, the height of the output sheet is set to the long side of the finish size. In the present example, the width of the output sheet is set to 610 mm (24 inches) and the height of the output sheet is set to 1188 mm.

In step S903, the size of the output sheet obtained in step S901 and step S902 is registered as a custom sheet that can be handled by the printer driver. As a result of this step, when the window shown in FIG. 4 is opened in the future poster printing, the registered size will be displayed in the finish size combo box 302 as one of a plurality of sizes that can be selected. In the present example, 610 mm (24 inches)×1188 mm is registered. As described, the user may select the registered size as displayed in this way for selection in the combo box 302. Alternatively, the registered size may not be displayed but may be automatically set as the size of the output sheet in step S904 which will be described later. Furthermore, the registered size is used in the printing this time, but may not necessarily be used in the future printing. Accordingly, the size may be deleted from the size combo box 302 after printing is performed according to the processing described later.

In step S904, the size of the output sheet obtained in step S903 is registered as the size of the output sheet which is actually used for printing by the printer 2. The present processing is completed.

Refer back to FIG. 6 again. After the size of the output sheet is set in step S606, the process proceeds to step S607. The printer driver 4 enlarges the original image according to the scaling factor D set in step S604. Referring to FIG. 7, in the present example, an enlarged image I2 of the A0 size (840 mm×1188 mm) is generated from an original image I1 of the A2 size (420 mm×594 mm) by a scaling factor D=2.0.

In step S608, the enlarged image generated in step S607 is divided based on the number of segments N set in step S605, and the resulting image portions are laid out based on the size of the output sheet set in step S606. In the present example, the enlarged image I2 is divided into image portions I3 and I4 based on the number of segments N=2. Then, the image portions I3 and I4 are laid out in the set size of the output sheet so that the image portions form a continuous image when pasted together with margin areas. As a result of this step, print data that can be received by the printer is generated.

Figure 11:
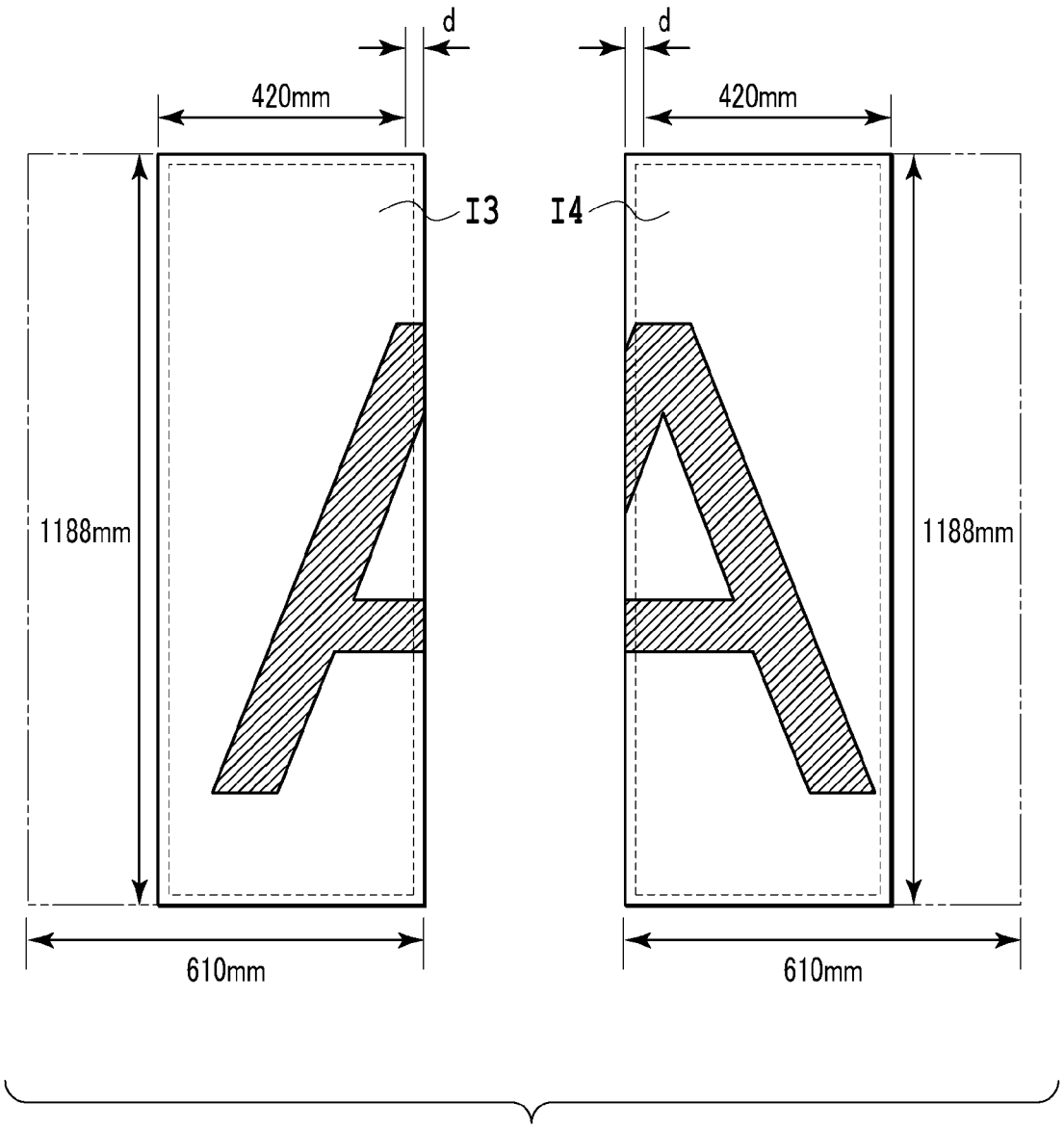
FIG. 11 is a diagram showing the layout of image portions.

FIG. 11 is a diagram showing the layout in the present example. Of the two image portions I3 and I4, the image portion I3 on the left is arranged such that the right end portion of the image portion I3 is located away from the right end of the output sheet by a margin area d. Meanwhile, the image portion I4 on the right is arranged such that the left end portion of the image portion I4 is located away from the left end of the output sheet by a margin area d. As a result, the output sheet on which the image portion I3 is printed has a blank of (610−(420+d)) mm on the left side, whereas the output sheet on which the image portion I4 is printed has a blank of (610−(420+d)) mm on the right side. Incidentally, the above-described layout method is given for illustration and any other method can be used. For example, in a case where the printer 2 has a configuration in which an image can be printed without margins on both ends of the roll paper, it is possible to lay out the image with a margin area d=0. In this case, the image portion I3 on the left is arranged such that the right end portion of the image portion I3 coincides with the right end of the output sheet, whereas the image portion I4 on the right is arranged such that the left end portion of the image portion I4 coincides with the left end of the output sheet.

In step S609, the printer 2 is driven according to the image data of a plurality of pages laid out in step S608 to output printed materials. More specifically, referring to FIG. 3, after the output sheet having a width of 610 mm held in a roll is supplied to the conveying path, the image portions I3 and I4 laid out as shown in FIG. 11 are sequentially printed in the printing unit 4. Then, after the output sheet is cut by the cutter unit 6 into printed materials having a length of 1188 mm as set for the long side of the output sheet, the printed materials are discharged to the tray 12. The present processing is completed.

Figure 12:
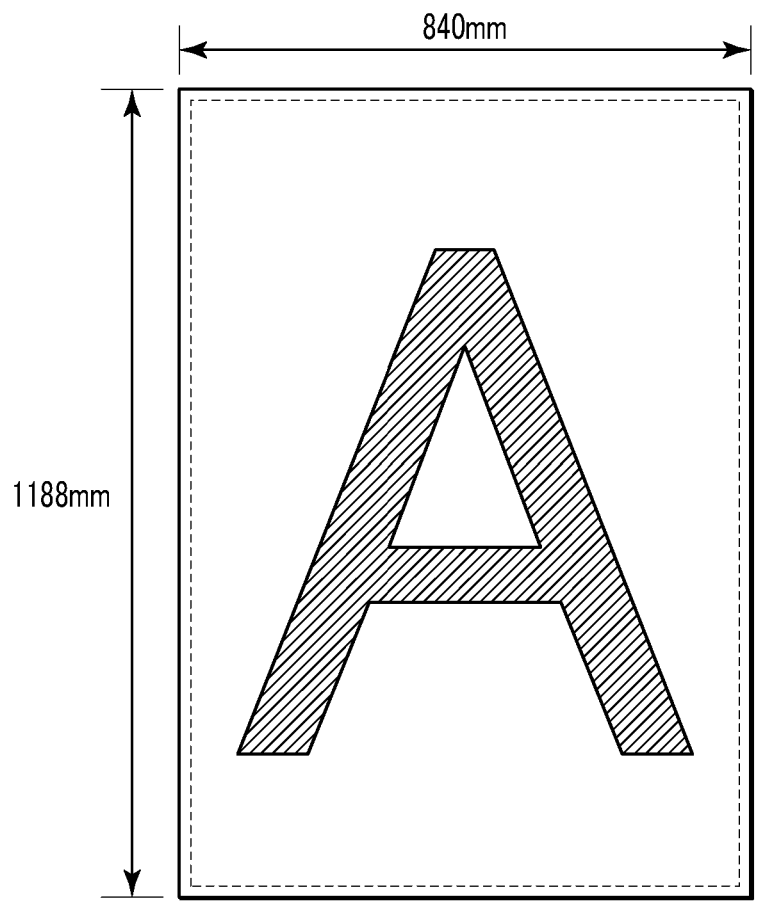
FIG. 12 is a product resulting from poster printing.

After that, the user uses the margin area d for pasting areas, and bonds the two output printed materials together. Accordingly, a product having the desired A0 size (840 mm×1188 mm) as shown in FIG. 12 can be obtained.

As described above, according to the present invention, the user only needs to specify a desired original image and finish size so as to output a minimum number of printed materials on continuous paper loaded on the printer. As a result, the user can obtain a product (poster) of a desired size with a minimum pasting procedure.

Incidentally, a description has been given of the case where the enlarged image generated in step S608 is divided after enlarged image generation processing is performed on the original image in step S607 in the flow chart of FIG. 6. However, the enlargement processing and dividing processing may be performed in inverse order.

Furthermore, by way of example, continuous paper such as roll paper is used for a sheet on which an image to be printed is printed in the above embodiment. However, examples of the paper include so-called cut paper which has a fixed width and height. Even in this case, through the process described with reference to FIG. 8, the automatic rotation of an image or the setting of a scaling factor are performed so that the short side of the image to be printed matches the short side of the finish size. Accordingly, it is possible to obtain the same effect as in the case of using the continuous paper.

As shown in FIG. 1, the printing system including the host device 1 having the printer driver installed thereon and the printer 2 has been described as a print control apparatus of the present invention. However, the print control apparatus of the present invention may have any other configuration. For example, the printer 2 itself may perform the entire process shown in FIG. 6, which has been described as the process performed by the printer driver. In this case, the printer itself functions as the print control apparatus of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-011402, filed Jan. 24, 2014, which is hereby incorporated by reference wherein in its entirety.

What is claimed is:

1. A print control apparatus for causing a printing apparatus to print on a print sheet each of a plurality of image portions generated by dividing an image to be printed, the print control apparatus comprising:

a memory configured to store a program;

a processor configured to execute the program stored in the memory, wherein the processor obtains a finish size corresponding to a size resulting from bonding together a plurality of print sheets having the plurality of image portions respectively printed thereon, wherein the processor selects from among (a) having a whole of the image to be printed in the finish size and (b) having the image to be printed extend out from the finish size in a case where an aspect ratio of the image is different from an aspect ratio of the finish size, and wherein the processor generates each of the plurality of image portions by enlarging the image by varying a scaling factor depending on both of a result of the selection and the finish size, and by dividing the image such that the image is divided in a short-side direction of the image with a number of segments which is based on a length of a short side of the finish size and a length of a short side of each of the print sheets, and wherein the processor causes the printing apparatus to print the plurality of image portions respectively on the print sheets such that a short side of each of the plurality of image portions coincides with a short side of each of the print sheets.

2. A print control apparatus according to claim 1, wherein the print sheet is continuous paper, and the short side of the print sheet is equal to a width of the continuous paper.

3. A print control apparatus according to claim 1, wherein the finish size is specified by a user.

4. A print control apparatus according to claim 1, wherein the program is a printer driver.

5. A print control apparatus according to claim 1, wherein the processor enlarges the image and then divides the enlarged image.

6. A print control apparatus according to claim 5, wherein the processor obtains a length of a short side of each of the print sheets, and performs the division based on the obtained length.

7. A print control apparatus according to claim 6, wherein the processor calculates the number of segments by which the image is divided in a short side direction of the image based on a length of a short side of the finish size and the length of the short side of each of the print sheets.

8. A print control apparatus according to claim 1, wherein the processor causes an external printing apparatus connected to the print control apparatus to print each of the plurality of image portions.

9. A print control apparatus according to claim 1, wherein the processor causes a printing apparatus included in the print control apparatus to print each of the plurality of image portions.

10. A print control apparatus according to claim 1, wherein the processor performs the selection from among (a) having the whole of the image to be printed in the finish size and (b) having the image to be printed extend out from the finish size, in accordance with an instruction by a user.

11. A print control method, performed by a printing system including a print control apparatus and a printing apparatus, for causing the printing apparatus to print on a print sheet each of a plurality of image portions generated by dividing an image to be printed, the print control method comprising:

an obtaining step of obtaining a finish size corresponding to a size resulting from bonding together a plurality of print sheets having the plurality of image portions respectively printed thereon;

a selection step of selecting from among (a) having a whole of the image to be printed in the finish size obtained in the obtaining step and (b) having the image to be printed extend out from the finish size in a case where an aspect ratio of the image is different from an aspect ratio of the finish size;

a generation step of generating each of the plurality of image portions by enlarging the image by varying a scaling factor depending on both of a result of the selection in the selection step and the finish size, and by dividing the image such that the image is divided in a short-side direction of the image with a number of segments which is based on a length of a short side of finish size and a length of a short side of each of the print sheets; and a print control step of causing the printing apparatus to print the plurality of image portions generated in the generation step respectively on the print sheets such that a short side of each of the plurality of image portions obtained by the division coincides with a short side of each of the print sheets.

12. A print control method according to claim 11, wherein the print sheet is continuous paper, and the short side of the print sheet is equal to a width of the continuous paper.

13. A print control method according to claim 11, wherein the finish size is specified by a user.

14. A print control method according to claim 11, wherein a program used to perform the print control method is a printer driver.

15. A print control method according to claim 11, wherein in the generation step, the image is enlarged and then the enlarged image is divided.

16. A print control method according to claim 15, further comprising an obtaining step, performed by the printing system, of obtaining a length of a short side of each of the print sheets, wherein in the dividing step, the division is performed based on the obtained length.

17. A print control method according to claim 16, further comprising a calculation step, performed by the printing system, of calculating the number of segments by which the image is divided in a short side direction of the image based on a length of a short side of the finish size and the length of the short side of each of the print sheets.

18. A non-transitory computer readable storage medium storing a program for causing a computer to perform the print control method according to claim 11.

19. A print control method according to claim 11, wherein the selection in the selection step is performed in accordance with an instruction by a user.

* * * * *